United States Patent [19]

Mehl

[11] 3,890,203

[45] June 17, 1975

[54] METHOD AND APPARATUS FOR THE COLLECTION, CULTIVATION AND IDENTIFICATION OF MICROORGANISMS FROM BODY FLUID

[75] Inventor: Jack Judson Mehl, Landing, N.J.

[73] Assignee: Becton, Dickinson and Company, East Rutherford, N.J.

[22] Filed: Mar. 16, 1973

[21] Appl. No.: 342,086

Related U.S. Application Data

[63] Continuation-in-part of Ser. No. 215,730, Jan. 6, 1972, abandoned.

[52] U.S. Cl. .................. 195/139; 195/142; 128/2 F
[51] Int. Cl. .............................................. C12b 1/00
[58] Field of Search ............. 195/139, 142; 128/2 F, 128/214.2

[56] References Cited
UNITED STATES PATENTS

| | | | |
|---|---|---|---|
| 2,722,932 | 11/1955 | Hickey | 128/214.2 |
| 2,794,435 | 6/1957 | Stevens | 128/214.2 |
| 2,992,974 | 7/1961 | Belcove et al. | 195/139 |
| 3,063,451 | 11/1962 | Kuwalk | 128/221 |
| 3,545,427 | 12/1970 | Ryan | 128/2 F |
| 3,730,170 | 5/1973 | Michael | 128/2 F |

*Primary Examiner*—Alvin E. Tanenholtz
*Attorney, Agent, or Firm*—Kane, Dalsimer, Kane, Sullivan and Kurucz

[57] ABSTRACT

An improved apparatus and method for the collection, cultivation and identification of microorganisms obtained from body fluids is disclosed. The apparatus includes an evacuated tube containing a culture medium, an inert gaseous atmosphere and a vent-cap assembly. The tube containing the culture medium is fitted with a stopper for introduction of body fluid by means of a cannula and after growth of the organisms, transfer of the cultured medium is completed for subculturing or identification procedures.

15 Claims, 12 Drawing Figures

PATENTED JUN 17 1975   SHEET 1   3,890,203

PATENTED JUN 17 1975 SHEET 4 3,890,203

METHOD AND APPARATUS FOR THE COLLECTION, CULTIVATION AND IDENTIFICATION OF MICROORGANISMS FROM BODY FLUID

CROSS REFERENCE TO RELATED APPLICATION

This is a continuation-in-part application of Ser. No. 215,730 filed on Jan. 6, 1972 now abandoned.

BACKGROUND OF THE INVENTION

There are various methods and assemblies employed for the culturing of microorganisms, particularly microorganisms contained in body fluids, such as blood. The culturing of blood is of great importance since blood is normally considered sterile and any microorganisms contained in blood are indicative of an active infection. Present practice requires that whole blood be diluted so that a general dilution of blood to media of from 1-to-8 to 1-to-10 is obtained for culturing purposes. Further, where infections in the blood are caused by either aerobic or anaerobic microorganisms, heretofore it has been necessary to culture these in separate containers each having the proper medium and gaseous atmosphere.

There are three popular techniques for the collection of blood or other body fluids. The collection may be accomplished by the use of a syringe and needle assembly to withdraw blood from a vein, then inoculation of the blood into two or three sterile containers of media. A second method is to employ an evacuated tube containing an anti-coagulant when collecting blood and subsequently to transfer a portion of the collected blood to the appropriate medium by needle and syringe or by removal of the stopper from the evacuated tube and measuring the appropriate amount of blood specimen by use of a pipette. A third method for the collection of blood employs a piece of flexible tubing having needle assemblies at each end thereof; one of the needle assemblies adapted for use for entering a vein and the other for directly inserting into an evacuated tube with or without liquid and solid culture media disposed therein. However, when using this technique it is necessary to clamp the tube to prevent additional blood from entering the container so as to maintain the proper blood-to-medium ratio. It also requires the use of two types of evacuated tubes, one for aerobic and one for anaerobic organisms.

One of the problems encountered while culturing anaerobic microorganisms is the possibility of the stopper being forced from the evacuated tube by the internal gas pressure and, in some instances, where a screw cap is used and later is removed, the stopper may explode from the opening thereby causing contamination of the work area.

In all of the present methods employed strict aseptic techniques must be maintained to avoid foreign bacteria contaminating the sample to be cultured.

SUMMARY OF THE INVENTION

It is an object of the present invention to provide an improved culturing system for the collection, cultivation and identification of microorganisms obtained from body fluids. It is another object of the invention to provide a method and apparatus for the cultivation of either aerobic or anaerobic microorganisms or both simultaneously in a single culturing assembly. A further object of the invention is to provide a collection container which automatically draws a controlled amount of body fluid, particularly blood, so as to provide a predetermined ratio of body fluid to medium without the necessity for measuring the quantity of body fluid required. It is also an object of the invention to provide a vent unit assembly adapted to maintain sterility of the stopper after it has been sterilized and prevent contamination of the culture medium during incubation. Also, an outlet means is provided for gases generated by the growth of microorganisms and for the inflow of oxygen to sustain the growth of the aerobic microorganisms. The outlet and inflow means includes a total path length and a plurality of passages of such small cross section that they constitute a microorganism trap or barrier. It is also an object of the invention to provide a disposable system for collecting and culturing microorganisms, which system is inexpensive to manufacture and simple to use and maintain in aseptic condition when collecting or transferring body fluids to the culture medium.

It is an object of the invention to provide an assembly to simultaneously culture aerobic and anaerobic microorganisms in which the assembly includes means for controlling and limiting the rate of oxygen diffusion through the culture medium.

In general, my invention provides an improved system for the collection of a specimen directly into a tube containing a medium suitable for the growth of microorganisms contained in the specimen. Various media may be used, as preferred, including agents which change color, thereby identifying certain classes of microorganisms. The system comprises means for automatically collecting the proper proportion of sample so that a predetermined sample-to-medium ratio is obtained. Means are also provided to effect a transfer of the sample to the medium under aseptic conditions without special equipment or procedures being employed. Means for maintaining a proper atmosphere within the sample tube for the growth of either aerobic or anaerobic microorganisms in a single culturing container is also provided.

My improved method employs a venipuncture assembly for collecting blood from a vein such as an assembly employing an evacuated tube and a holder or barrel fitted with a sample needle. Such an assembly is disclosed in U.S. Pat. No. 2,460,641 and the multiple sample needle is disclosed in U.S. Pat. Nos. 3,469,572 and 3,494,352. An evacuated tube containing a desired culture medium is employed to draw the blood through the sample needle. The evacuated tube is provided with a sufficiently reduced pressure to collect a predetermined amount of blood therein and is also provided with an inert atmosphere such as carbon dioxide or nitrogen. The tube stopper is sterilized and then a venting assembly is mounted on the collection tube so as to maintain a sterile field around the stopper during incubation. The venting unit comprises a barrel portion having a diameter slightly larger than the sample tube stopper and a needle is mounted in the closed end of the barrel. One pointed end of the needle extends into the barrel portion a distance sufficient to penetrate the stopper so as to provide communication between the interior of the tube and the atmosphere. The other end of the needle extends away from the stopper and is fitted with a venting shield including minute passageways so that atmospheric air can enter the culture tube while gases generated from the growth of microorganisms may flow out of the tube.

After the culture tube fitted with the venting unit has been placed in the proper atmosphere and thermal environment such as an incubator at 35°C. and microorganism growth is evident a sample of the culture medium may be taken for subculture purposes and for further growth and subsequent identification. The culture assembly is so arranged that aerobic organisms will grow at or near the top surface of the culture medium. The anaerobic organisms will grow at or near the bottom of the culture tube, while facultative and actively motile organisms may be found throughout the culture medium.

Samples of the culture medium are removed from the culture tube employing aseptic techniques to avoid outside contamination. Various procedures may be employed for removal of culture medium. The stopper may be removed together with the venting unit intact. Then, a sample from the topmost portion of the culture medium is collected either by use of a sterile pipette or a sterile syringe and needle. The sample is transferred to a sub-culture assembly such as a Petri dish containing the proper solid culture medium for identification of the suspected aerobic organisms.

A second sample may be taken from the culture tube by insertion of a sterile pipette or sterile needle and syringe assembly so that the tip thereof is disposed near the bottom of the tube. The sample to be cultured is transferred to a sub-culture assembly as before. A third sample may be taken from the middle of the culture by the technique described above. The sub-cultures are cultured in the proper thermal environment and in the proper gaseous atmosphere, aerobic in the presence of atmospheric air and anaerobic in the presence of either nitrogen or carbon dioxide or both or other means generally known to the art. The facultative organisms will grow in either the presence of oxygen or in the absence of oxygen.

Figure 10:
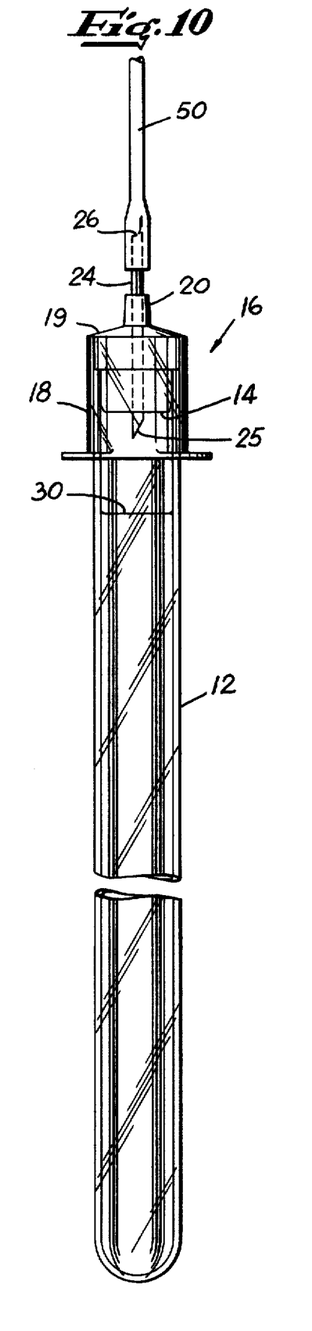
FIG. 10 is a side elevation showing how gases generated by the microorganisms being cultured may be conducted to a means for analyzing these gases.

The venting unit is so arranged that a flexible tube may be mounted over the exterior end of the needle as shown in FIG. 10. The other end of the flexible tube may be connected to an instrument or alternative means for determining the presence of a particular gas generated by the organisms.

DESCRIPTION OF THE PREFERRED EMBODIMENT

Figures 1, 2, 4:
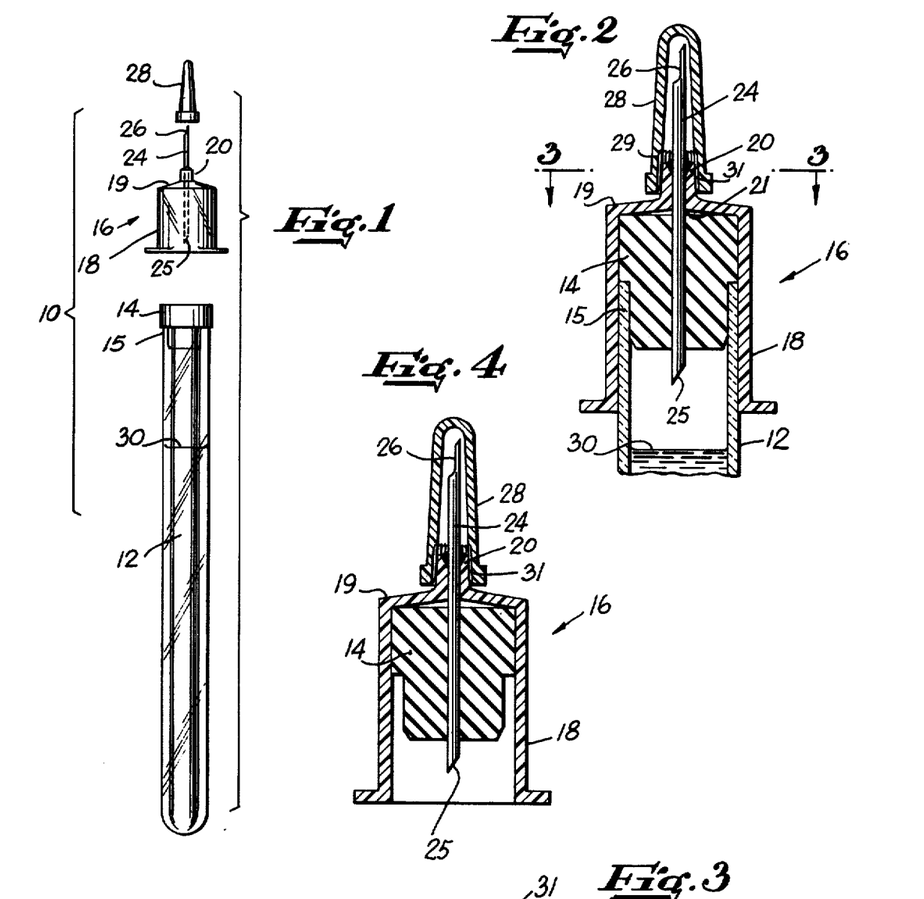
FIG. 1 is an exploded view in elevation of the culturing assembly of the invention ready for use.
FIG. 2 is a fragmentary view of the venting unit mounted in position on the culturing tube shown in FIG. 1.
FIG. 4 is a sectional view in elevation of the venting unit and the stopper removed from the culture tube of FIG. 2.

The improved culture system for culturing microorganisms either strictly aerobic or anaerobic is shown in FIG. 1 in exploded detail and is referred to by the numeral 10. An evacuated tube or container 12 is employed which may be formed of glass or a transparent plastic material, and is non-toxic to and inert to the culture medium and organisms to be cultured. A stopper 14 is removably mounted in the open end 15 of the culture tube 12.

A venting unit 16 is mounted on tube 12 as illustrated in FIG. 2. The venting unit includes a body portion 18 which is made of a flexible plastic, for example, polyethylene. The body portion 18 is cylindrically shaped having a diameter slightly larger than stopper 14 of culture tube 12 and is open at one end so that the stoppered end of the tube will be capped by venting unit 16 as shown in FIG. 2. The other end of the body portion is closed by an end wall 19. A hub or tip 20 is formed at the center of wall 19 and has an axial bore 21 formed therethrough so that cannula 24 will be positioned axially of body portion 18. Cannula 24 is rigidly mounted in bore 21 by any suitable means, such as by epoxy. Cannula 24 is mounted in tip 20 between ends 25 and 26. End 25 is pointed to facilitate piercing stopper 14 so that fluid communication is maintained between the interior of tube 12 and the atmosphere.

As shown in FIG. 2 the venting unit is mounted in position with the pointed end 25 of the cannula 24 extending through the stopper 14 so that the pointed end 25 is spaced from the top of the culture medium 30. When the assembly 10 is placed in the proper thermal environment an exchange of atmosphere is accomplished by cannula 24 by passing gases contained in the space above the culture medium 30 through cannula 24 to the atmosphere and passing the proper atmosphere into the space above the culture media.

Figure 3:
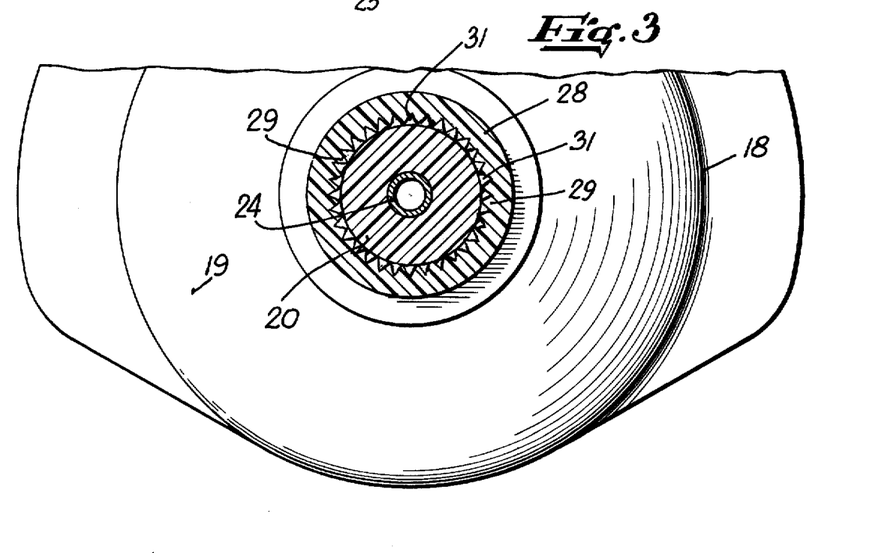
FIG. 3 is an enlarged fragmentary sectional view taken along the lines 3—3 of FIG. 2.

Venting unit 16 also includes a plastic shield 28 which is formed having internal ridges 29, as shown in FIG. 3, disposed around the interior thereof so that when it is removably mounted on tip 20, the ridges contact the outer surface of tip 20 to form passageways 31 for conducting the atmosphere contained within the culture unit through the cannula 24 and subsequently may be expelled to the outside atmosphere. At the same time, the outside atmosphere will pass through the passageways 31 between ridges 29, and through cannula 24, so that the aerobic microorganisms contained in the culture unit will grow at an optimum rate.

Figure 11:
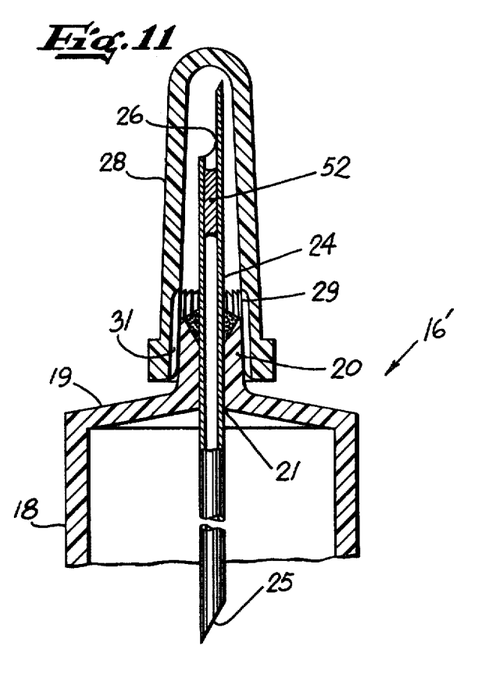
FIG. 11 is an enlarged fragmentary sectional view in elevation of the venting unit of FIG. 4 having removable plug means mounted in the cannula.

In FIG. 11 which illustrates another form of the venting unit, the passageway through cannula 24 may be plugged initially with a viscous material 52 such as a mixture of petroleum jelly and paraffin. This may be used when one desires that all oxygen be excluded from the medium initially when culturing anaerobic microorganisms. Then, as the gas pressure generated by these microorganisms, for example, $CO_2$, methane, or gas other than oxygen increases, the plug 52 of viscous material is pushed out of cannula 24, thereby establishing an open continuous passageway from the surface of the medium to the outside atmosphere, and thereby eliminating any possibility of gas pressure blowing out the stopper. At this advanced stage of growth, diffusion of atmospheric oxygen through the passageways to the surface of the medium would have no deleterious or inhibiting effect on the growth of the anaerobes.

In FIG. 4 the venting unit 16 is depicted illustrating one of the techniques employed to remove stopper 14 from culture tube 12 to obtain a sample of culture medium while maintaining aseptic conditions. Body 18 of the venting unit 16 is squeezed and by pulling upwardly the stopper is removed from tube 12. Thus, as illustrated, stopper 14 is shown pierced by cannula 24 with the pointed bevelled end 25 extending therethrough.

Figure 7:
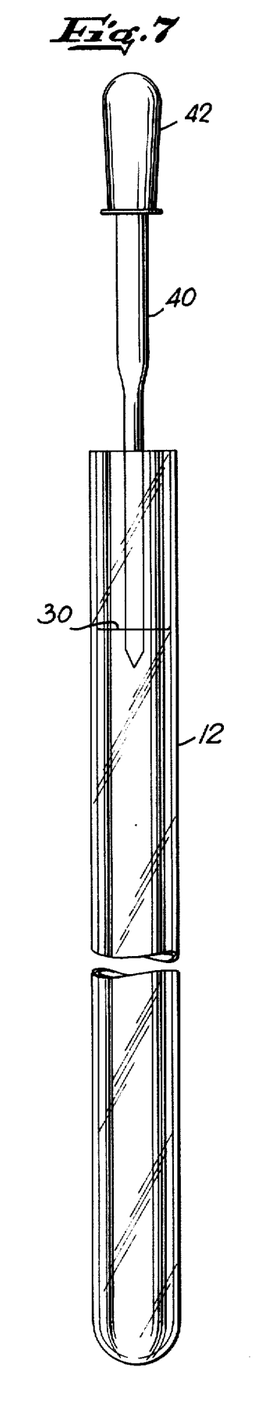
FIGS. 7 through 9 illustrate various procedures for removing culture samples from the culture tube.

FIG. 7 illustrates the culture tube 12 with stopper 14 removed. A pipette 40 fitted with a resilient bulb 42 at its outer end, is disposed into the tube so that the lower pointed end of the pipette is immersed in the culture medium. Any desired amount of inoculated culture medium may be removed for sub-culturing purposes.

Figure 8:
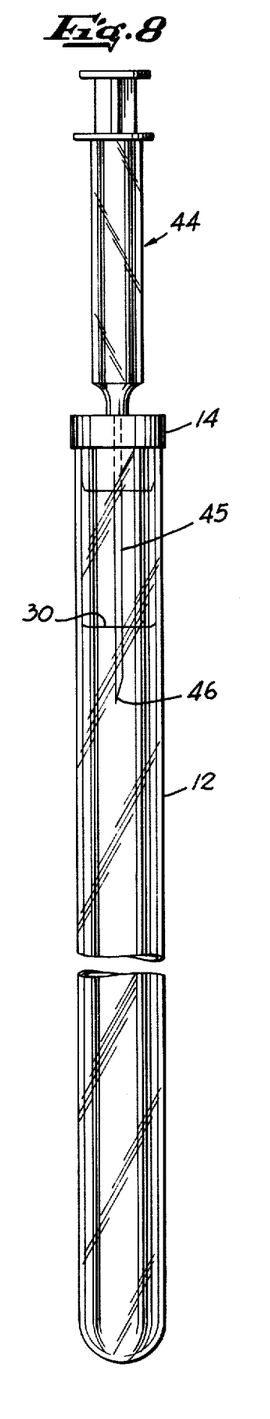

FIG. 8 illustrates still another method of removing a sample from culture tube 12 for sub-culturing purposes. The venting unit 16 is removed and a sterile syringe 44 and needle assembly is used to withdraw culture medium 30 from tube 12 by piercing stopper 14 with the needle 45. The needle is of sufficient length so that its pointed bevelled end 46 is immersed in the culture medium.

Figure 9:
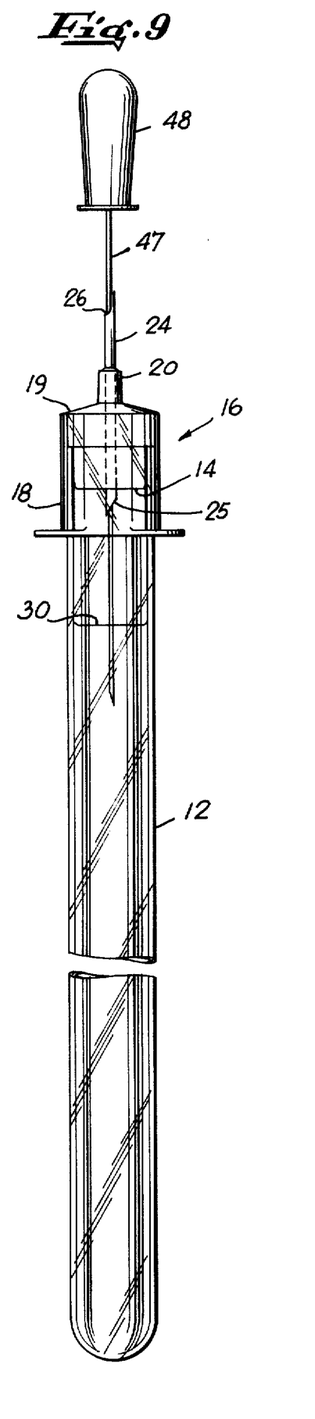

In FIG. 9 still another method for removal of culture medium 30 is illustrated. A micro pipette having cylindrical body 47 with a diameter sufficient to be slidably disposed within cannula 24 of the venting unit 16 is employed. The micro pipette is illustrated having a flexible bulb 48 mounted on the cylindrical body. It should be understood that any other means for withdrawing the sample may be employed, for example a hypodermic syringe with a long needle inserted through the cannula 24. After the sample is removed the shield 28 is replaced over tip 20 to maintain aseptic conditions.

FIG. 10 shows another use of the invention herein. The venting unit 16 is shown with the shield 28 removed. A flexible tube 50 is coupled to the outer end 26 of cannula 24 so that the gases contained within the culture tube 12 will be conducted through flexible tube 50 and analyzed by any suitable means so that the presence of a gas peculiar to certain types of organisms can be detected. Also, the volume of gas being generated by the organisms will be indicative of the growth rate of the culture within the tube.

Figure 12:
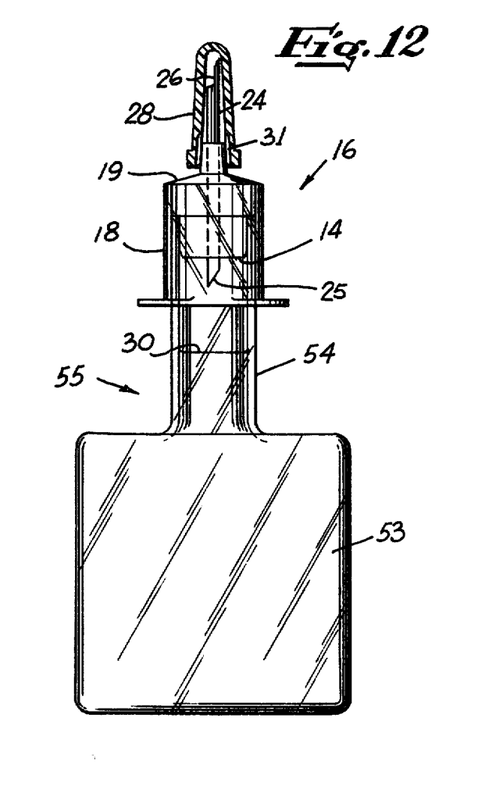
FIG. 12 is a side elevation, partly in section, of another form of the container for the culture medium, with the venting unit mounted in place.

In the embodiment illustrated in FIG. 12 container 55 may be shaped approximately as shown. Tubular neck portion 54 is approximately the size and shape of the upper portion of container 12, so as to cooperate with the venting unit 16, in the manner as previously described and shown in FIG. 4. The primary advantage for having the container 55 in the form illustrated in FIG. 12 is to provide for a much larger blood sample. If only a few of a given type of microorganism are present in the blood stream, statistically there is a much better chance to detecting this type of microorganism if the size of the blood sample can be substantially increased while maintaining the 1-to-8 to 1-to-10 dilution ratio for culturing.

Another advantage for having container 55 as illustrated in FIG. 12 is to provide a base which will permit container 55 to stand upright without having to be placed in a tube rack or holder.

It is contemplated when employing the invention herein that any suitable culture medium may be used to culture microorganisms that may be contained in body fluids. An example of a culturing medium that may be used is Supplemented Peptone Broth blood culture medium, sold by Becton, Dickinson and Company. Many culture mediums are available commercially for culturing specific microorganisms and many are modified for culturing several types of microorganisms. The body fluids that may be employed for culturing purposes when using the invention of the assembly herein are, for example, synovial fluid, spinal fluid, peritoneal fluid, pleural fluid, urine, blood, etc.

The reason the very desirable culturing of both aerobic and anaerobic microorganisms simultaneously is possible with the assembly of the invention herein is that design factors in combination are utilized providing a very large diminishing oxygen gradient. Even though oxygen at normal atmospheric partial pressure is present outside the device of the invention, the design factors thereof are so proportioned and combined that the amount of oxygen diffusing toward the bottom of the column of the culture medium is less than that which will adversely affect the growth and multiplication of anaerobic microorganisms contained therein. The significant design factors are the following stated in terms of diminishing the rate of oxygen diffusion in respect to:

1. the total cross section of the microbial trap, i.e., passageways 31 formed between ribs 29, the smaller the cross section the less the diffusion rate;

2. the longer the passageway 31 of the microbial trap the smaller the diffusion;

3. the smaller the cross sectional diameter of the lumen of the cannula 24 of the venting unit 16, the smaller the oxygen diffusion;

4. the longer the lumen of the cannula 24 of the venting unit 16, the smaller the oxygen diffusion;

5. the smaller the cross sectional area of the top of the column of culture medium 30 the smaller the oxygen diffusion; and 6. the longer the column of culture medium 30 (from top to bottom) the smaller the oxygen diffusion.

The ranges of dimensions of these factors in combination, in a preferred form of the invention, are substantially as follows:

1. the total cross sectional area of the passageways 31 of the microbial trap ranging from 0.000025 square inch to 0.002500 square inch in combination with:

2. the length of the passageways 31 of the microbial trap ranging from 0.200 inches to 0.625 inches, in combination with;

3. the diameter of the lumen of the cannula of the venting unit ranging from 0.016 to 0.052 inches, in combination with;

4. the length of the lumen of the cannula of the venting unit ranging from 0.50 to 2.000 inches, in combination with;

5. the total cross sectional area of the top of the column of culture medium equivalent to a disc ranging from a diameter of 10 millimeters to 20 millimeters, in combination with;

6. a length of culture medium column ranging from 50 millimeters to 200 millimeters.

The following example is illustrative of the use of the invention herein for culturing microorganisms which may be either strict anaerobic or strict aerobes in the same culturing tube employing the same culturing medium where the body fluid is blood.

EXAMPLE

Figure 5:
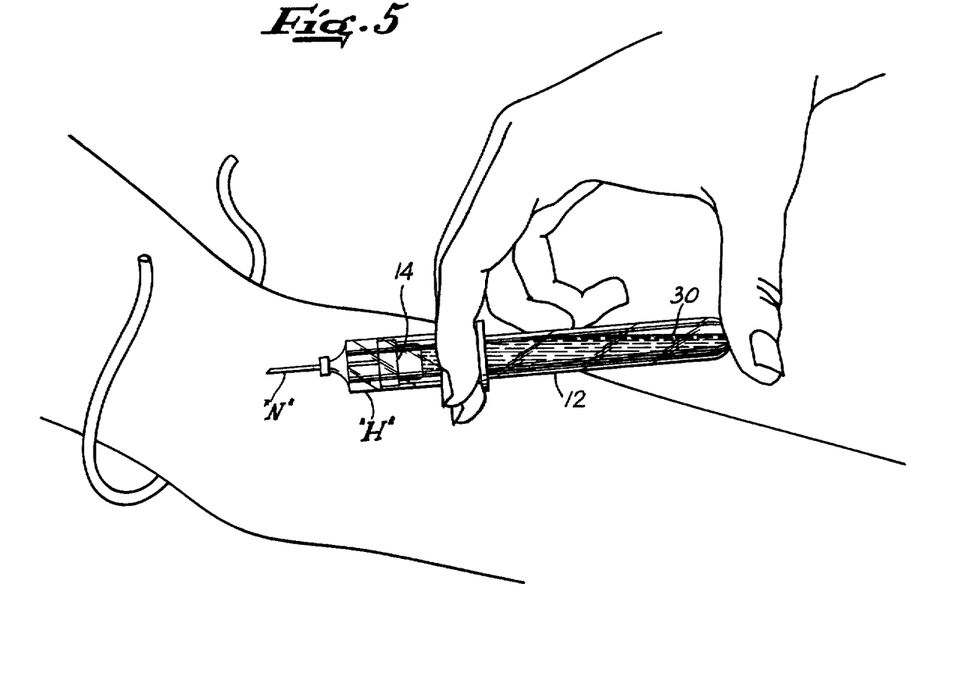
FIG. 5 is an elevational view of the culture tube in a holder shown in situ on a patient's arm and ready to receive a predetermined volume of blood.
Figure 6:
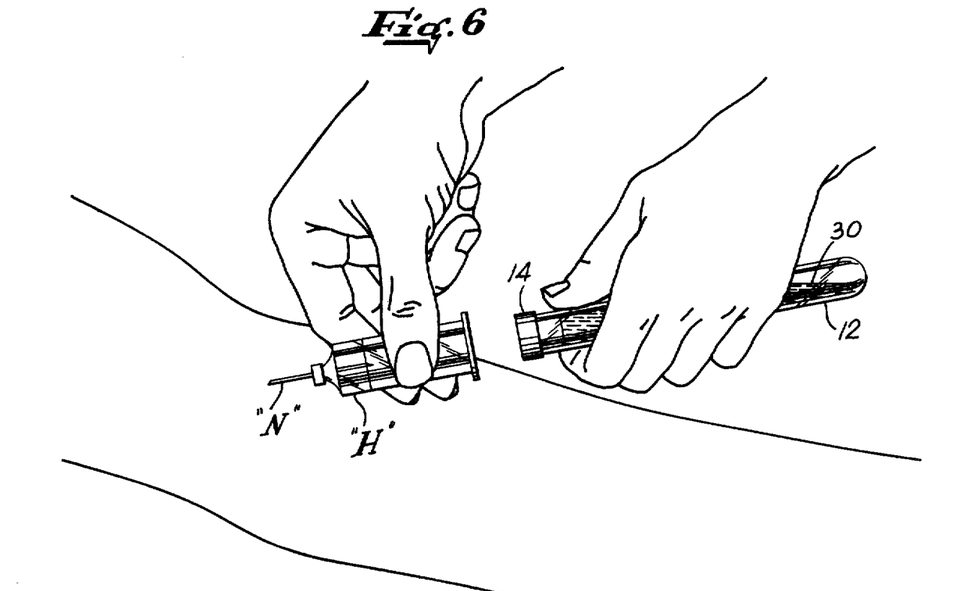
FIG. 6 is an elevational view showing the culture tube being removed from the holder in situ after the sample of blood is obtained.

A blood collecting assembly is employed, such as is disclosed in U.S. Pats. Nos. 3,469,572 and 3,494,352, where a culturing specimen is to be collected through a multiple sample needle along with other blood specimens for hematology or other determinations in the laboratory, utilizing the same venipuncture. Where only a culture specimen is required the blood collecting assembly may be employed such as is disclosed in U.S. Pat. No. 2,460,641. The blood collecting assembly of these patents includes a blood sampling needle N, a holder H for mounting the needle therein and for receiving and directing an evacuated tube into the assembly with the needle. Initially a venipuncture is made in the usual manner. A tube 16 mm in diameter containing a predetermined volume of gaseous carbon dioxide and nitrogen maintained at a predetermined pressure less than atmospheric pressure and containing a liquid blood culturing medium the length of which is 120 mm is placed in the holder H. The culturing medium used is Supplemented Peptone Broth blood culturing medium sold by Becton, Dickinson and Company. As illustrated in FIG. 5, the tube 12 is moved into the holder H so that the stopper 14 is penetrated by one end of the blood sampling needle N. Only a predetermined amount of blood will enter the tube so that the blood-to-culture medium ratio ranges from between 1-to-8 to 1-to-10. The culturing tube is withdrawn from the holder H as illustrated in FIG. 6 and is ready to be sent to the laboratory. Before placing the tube in the proper thermal environment the contents are thoroughly mixed by repeated inversion and a venting unit is mounted on the culturing tube such that the stopper is punctured by a venting cannula mounted in the venting unit. The venting cannula has a length of 1.45 inches and a lumen diameter of 0.040 inches. The venting unit is fitted with a venting cap to maintain sterility and to provide a flow of gaseous atmosphere into and microbial gaseous by-products out of the culture tube. The venting cap provides a plurality of passageways forming a microbial trap so that the diffusion of gaseous atmosphere into the culture is maintained at a controlled rate. The passageways have a cross sectional area of 0.00025 square inches and a length of 0.625 inches. The rubber stopper of the culturing tube is maintained in aseptic condition to prevent outside contamination by bacteria. Where aerobic or both anaerobic and aerobic culturing is to take place, the atmosphere within the incubator is air, or air plus added carbon dioxide.

The culturing assembly is maintained in an upright position in an incubator in the proper thermal environment and atmosphere for a predetermined period such as for 12 to 24 hours. A sample is then removed for sub-culturing or staining. Any of the techniques for removing specimens from the culturing tube for sub-culturing as set forth in FIGS. 7 through 9 may be employed.

Also, another method for removing a sample of incubated culture medium and blood is to remove the venting unit; mix the cultured medium and blood sample by repeated inversion; replace the venting unit; remove the shield 28; and invert the container so that the venting unit is downward and shake gently to expel one or more drops of liquid through cannula 24 onto a receiving surface, such as a sub-culture medium or slide. It should be remembered, however, that any of the procedures followed must be under aseptic conditions to prevent outside contamination.

It is obvious where body fluids other than blood are to be employed the culturing medium may be modified accordingly particularly where a specific type of organism may be suspected of being present. Many modifications and changes may be made without departing from the teachings herein and as defined in the appended claims.

I claim:

1. An apparatus for collection, cultivation and identification of microorganisms contained in a specimen of body fluid, said apparatus comprising:

a container having at least one closed end and an open end;

resilient closure means closing said open end of said container;

a nutrient medium partially filling said container and suitable for culturing microorganisms contained in said specimen;

a gaseous atmosphere filling the space above said nutrient medium; and a venting assembly mounted on the container and having means for maintaining fluid communication between the outside atmosphere and the atmosphere within the container, said venting assembly comprising a tubular member passing through said resilient closure to provide fluid communication between said gaseous atmosphere above the nutrient medium and the atmosphere outside of said container, said venting assembly including a flexible body portion having a closed end and an open end so that the closure means fitted in the open end of the container is capped thereby;

the closed end of the body portion is formed with a hub having an axial bore therethrough and said tubular member is a cannula rigidly mounted in the axial bore between the ends of said bore; and a shield mounted on the hub to enclose the portion of the cannula extending outwardly from the closed end of the body portion, the shield being formed with a plurality of ribs which are radially disposed around the inner surface thereof so that the shield when mounted on the hub forms a plurality of passageways for the circulation of microbial gases from the interior of the container to the outside atmosphere and for diffusion of atmospheric oxygen from the outside to the inside of the container.

2. The apparatus of claim 1 wherein the gaseous atmosphere is a non-oxidizing gaseous atmosphere.

3. The apparatus of claim 1 wherein the atmosphere is nitrogen.

4. The apparatus of claim 1 wherein the atmosphere is carbon dioxide.

5. The apparatus of claim 1 wherein said tubular member is adapted to receive a micropipette for withdrawing a portion of the culture medium from said container.

6. The apparatus of claim 1 wherein said body portion is a resilient material capable of being squeezed sufficiently to grasp the capped resilient closure means to remove both the closure means and venting assembly from the container simultaneously.

7. The apparatus of claim 1 wherein said container is formed having a narrow elongated neck portion integrally formed with an enlarged lower body portion.

8. The apparatus of claim 1 wherein the container has a length of culture medium disposed therein of from 50 millimeters to 200 millimeters.

9. The apparatus of claim 1 wherein the cross sectional area of the container adjacent the open end is from 10 millimeters to 20 millimeters.

10. The apparatus of claim 1 wherein the cannula mounted in said venting assembly is from 0.50 to 2.00 inches.

11. The apparatus of claim 1 wherein the cannula of the venting assembly has a cross sectional diameter of from between 0.016 to 0.052 inches.

12. The apparatus of claim 1 wherein the length of each of said passageways is from 0.200 to 0.625 inches.

13. The apparatus of claim 1 wherein the total cross sectional area of each of said passageways is from 0.000025 to 0.002500 square inches.

14. The apparatus of claim 1 wherein said total cross sectional area of each of said passageways is from 0.000025 to 0.002500 square inches; the length of each passageway is from 0.200 to 0.625; the diameter of the lumen of the cannula is from 0.016 to 0.052 inches; the length of the cannula is from 0.50 to 2.00 inches; the total cross sectional area of the top of the container adjacent the opening is from 10 millimeters to 20 millimeters; and the length of the culture medium is from 50 millimeters to 200 millimeters.

15. The apparatus of claim 1 wherein said total cross sectional area of each of said passageways if 0.00025 square inches; the length of each passageway is 0.625; the diameter of the lumen of the cannula is 0.040 inches; the length of the cannula is 1.45 inches; the total cross sectional area of the top of the container adjacent the opening is 16 millimeters; and the length of the column of culture medium is 120 millimeters.

* * * * *

UNITED STATES PATENT OFFICE
CERTIFICATE OF CORRECTION

PATENT NO. : 3,890,203
DATED : June 17, 1975
INVENTOR(S) : Jack Judson Mehl

It is certified that error appears in the above-identified patent and that said Letters Patent are hereby corrected as shown below:

At Column 10, Claim 15, line 2, after the word "passageways" delete the word "if" and insert -- is --

Signed and Sealed this second Day of September 1975

[SEAL]

Attest:

RUTH C. MASON
Attesting Officer

C. MARSHALL DANN
Commissioner of Patents and Trademarks